(12) United States Patent
Ignomirello

(10) Patent No.: US 9,031,624 B2
(45) Date of Patent: May 12, 2015

(54) INTELLIGENT MIRROR

(71) Applicant: Brian Ignomirello, Colts Neck, NJ (US)

(72) Inventor: Brian Ignomirello, Colts Neck, NJ (US)

( * ) Notice: Subject to any disclaimer, the term of this patent is extended or adjusted under 35 U.S.C. 154(b) by 111 days.

(21) Appl. No.: 13/960,858

(22) Filed: Aug. 7, 2013

(65) Prior Publication Data

US 2015/0045097 A1    Feb. 12, 2015

(51) Int. Cl.
*B60R 11/02* (2006.01)

(52) U.S. Cl.
CPC .......... *B60R 11/0241* (2013.01); *H04B 1/3822* (2013.01); *H04B 1/3877* (2013.01)

(58) Field of Classification Search
CPC .......................... H04B 1/3877; B60R 11/0241
USPC ....................................... 455/575.9
See application file for complete search history.

(56) References Cited

U.S. PATENT DOCUMENTS

| | | | | |
|---|---|---|---|---|
| 5,940,503 | A * | 8/1999 | Palett et al. | 379/454 |
| 6,728,375 | B1 * | 4/2004 | Palett et al. | 379/454 |
| 6,877,870 | B2 | 4/2005 | Krug | |
| 6,889,064 | B2 | 5/2005 | Baratono | |
| 8,331,998 | B2 | 12/2012 | Baratono | |
| 2002/0003571 | A1 * | 1/2002 | Schofield et al. | 348/148 |
| 2003/0007261 | A1 * | 1/2003 | Hutzel et al. | 359/838 |
| 2003/0117728 | A1 * | 6/2003 | Hutzel et al. | 359/838 |
| 2006/0050018 | A1 * | 3/2006 | Hutzel et al. | 345/60 |
| 2010/0253597 | A1 | 10/2010 | Seder | |

FOREIGN PATENT DOCUMENTS

WO     02/49881  A1    6/2002
WO   2009/000987 A2   12/2008

* cited by examiner

*Primary Examiner* — Christian Hannon
(74) *Attorney, Agent, or Firm* — Maldjian Law Group LLC; John Maldjian; Alexander D. Walter

(57) ABSTRACT

A mobile telephone or cellular telephone unit and a rearview mirror housing of an automobile are combined to provide an improved telephone apparatus that allows for efficient projection of images on a windshield of a vehicle.

20 Claims, 8 Drawing Sheets

INTELLIGENT MIRROR

FIELD OF THE INVENTION

The present invention relates to the field of smartphones and their use in vehicles.

BACKGROUND OF THE INVENTION

The use of cellular telephones within automobiles is well known for providing a convenient means of communication. However, certain uses of this type of device while driving carries with it safety risks. Accordingly, many jurisdictions now deem it a violation of the law to dial, to text, to email or to talk on a cellular telephone while holding the phone. In order to permit drivers to use their phones while driving, but without violating the law, proposals have been made for mounting mobile telephones in a number of places within an automobile. For example, mountings for cellular telephones have been placed in the center console between the driver and the passenger seat and on the dashboard of a car. Additionally, proposals have been made to store cellular telephones within rearview mirror housings.

Although rearview mirror housings have been designed to hold cellular telephones, the uses of cellular telephones while contained within these housings have, to date, been limited to predictable applications. Thus, there is a need to develop new and non-obvious technologies, devices and uses for unleashing the potential applications for using a cellular telephone while in a vehicle.

SUMMARY OF THE INVENTION

The present invention provides a device for displaying images on the windshield of a car or other vehicle. The device for displaying images may be configured to receive a computer device such as a cellular telephone that is a smartphone or other portable computer device, to permit a user to use his or her computer device and to display images that appear on the device on a windshield of a vehicle. A "smartphone" is a cellular telephone that permits a user to do more than simply place telephone calls. For example, it is a device that is configured to permit a user to run one or more applications and/or to store data locally and/or to communicate with remote sources and/or to download data from those sources, as well as to transmit data to those sources. An example of a smartphone is Apple's iPhone. In various embodiments, the device for displaying images is an intelligent mirror that can be used to achieve one or more if not all of the following benefits: charging of the computer device, hands free use of the computer device and generating a heads up display, which refers to a transparent display that presents data without requiring users to look away from their usual viewpoints.

According to a first embodiment, the present invention is directed to a rearview mirror comprising: (a) a housing, wherein the housing comprises a docking element that is configured to receive a smartphone; (b) a reflective surface; (c) a touchscreen, wherein the touchscreen overlays part or all of the reflective surface and the touchscreen is configured to operate in at least two modes, wherein in a first mode the touchscreen is a graphic user interface that is configured to receive input from a user and wherein in a second mode, the touchscreen is transparent, thereby allowing reflection of light; and (d) a projector, wherein the projector is located on a rear side of the housing and is configured to project an image onto a windshield, wherein the rearview mirror is mounted within a vehicle.

According to a second embodiment, the present invention is directed to an automobile comprising: (a) an interior cabin; (b) a windshield; and (c) a rearview mirror that comprises (i) a housing, wherein the housing comprises a docking element that is configured to receive a smartphone (or other computer device), (ii) a reflective surface; (iii) a touchscreen, wherein the touchscreen overlays part or all of the reflective surface and the touchscreen is configured to operate in at least two modes, wherein in a first mode the touchscreen is a graphic user interface that is configured to receive input from a user and wherein in a second mode, the touchscreen is transparent thereby allowing reflection of light; and (iv) a projector, wherein the projector is located on a rear side of the housing and is configured to project an image onto a windshield.

Through the various embodiments of the present invention, one can efficiently and effectively use a computer device such as a smartphone within a vehicle. The various embodiments may be configured to allow for hands-free and/or touch controlled operation.

BRIEF DESCRIPTION OF THE FIGURES

Various embodiments of the present invention are described in the accompanying figures. These figures are provided for illustrative purposes and unless specified are not intended to be limiting. In order to provide the reader with an understanding of the various embodiments of the present invention, within these figures, different elements are not necessarily drawn to scale. Also to assist the reader, in a number of the figures there are notations of L and R, which refer to the left and right side of the rearview mirror when viewed by an occupant of a vehicle.

DETAILED DESCRIPTION OF THE INVENTION

Figure 1:
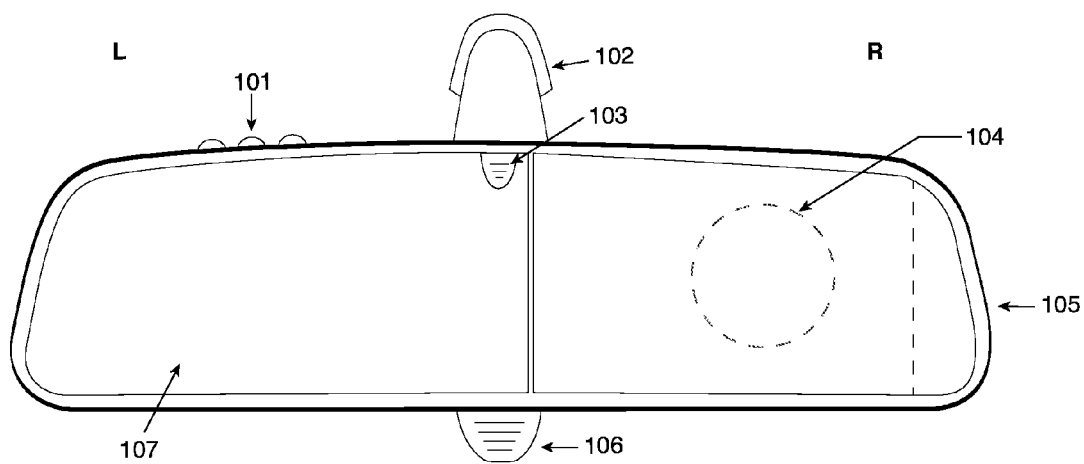
FIG. 1 is a representation of a front view of an intelligent mirror of the present invention.

Reference will now be made in detail to various embodiments of the present invention, examples of which are illustrated in the accompanying figures. In the following detailed description, numerous specific details are set forth in order to provide a thorough understanding of the present invention. However, unless otherwise indicated or implicit from context, the details are intended to be examples and should not be deemed to limit the scope of the invention in any way.

Any of the features of the various embodiments described herein can be used in conjunction with features described in connection with any other embodiments disclosed unless otherwise specified. Thus, features described in connection with the various or specific embodiments are not to be construed as not suitable in connection with other embodiments disclosed herein unless such exclusivity is explicitly stated or implicit from context.

According to one embodiment, the present invention is directed to a rearview mirror, which may also be referred to as an intelligent mirror. The rearview mirror comprises a housing, a reflective surface, a touchscreen and a projector.

The housing comprises a docking element that is configured to receive a computer device such as a smartphone (e.g., an iPhone, a Blackberry, or an Android) or other computer device (e.g., an iTouch). The housing may contain or be operably coupled to a spring locking and release mechanism that allows for insertion of the computer device into a receptacle that forms a cavity in which it will be retained. Additionally, there may be a stabilization feature that is capable of stabilizing a smartphone. The stabilization feature may, for example, be compressible cushioning or rubber material along one or more if not all of the sides of the receptacle.

The housing may, for example, comprise, consist essentially of or consist of a plastic material, a metal alloy or a combination thereof. Furthermore, the housing may be divided into three parts: L1, which contains most if not all of the electronics of the intelligent mirror; L2, which contains an ejection spring that is capable of causing ejection of the computer device and mechanics for permitting the computer device to be rotated up to ninety degrees; and L3, which contains a receptacle for receiving the computer device. In some embodiments, the receptacle is deep enough to house the entire computer device. In other embodiments, the computer device is less than 30%, less than 20%, less than 10% or less that 5% longer than the receptacle.

The reflective surface is capable of reflecting images. Thus, the mirror can exist in a first state as a traditional mirror and in a second state in which all or part of the mirror functions as a graphic user interface ("GUI"). When acting as a graphic user interface, in some embodiments there is a liquid crystal display screen and optionally a backlight. By way of example, in a first mode, a surface of the mirror may be darkened to allow the mirror function as a reflective mirror. In a second mode, there is backlighting that permits the images of the smartphone to be viewed. Because smartphones can be operated through touchscreen technologies, the outer surface of the mirror that overlays the smartphone may either be sufficiently thin to permit touching of the overlay to effect changes in the smartphone, or the overlay is itself a touchscreen that both projects the screen information from the smartphone onto the overlay and is configured to receive information from the smartphone and to transmit information received from a user touching the overlay to the smartphone. In this latter case, the intelligent mirror contains the requisite circuitry to allow communication from the GUI to the smartphone. Accordingly, by use of the touchscreen of the intelligent mirror, one may touch the mirror as opposed to the smartphone but still access the application of the touchscreen.

In some embodiments, a home button is present on the mirror. Activation of the home button controls movement of the touchscreen between the first mode and the second mode. For example, the home button may be located on the top of the rearview mirror. The button may be based on open/closed circuit technologies and thus, the length of time that a button is held will not affect the result of the action of pressing it.

A projector is located on a rear side of the housing and is configured to project an image onto a windshield. In some embodiments, the rearview mirror is mounted within a vehicle, and the projector is configured to generate a heads up display. The projector may, for example, be a pico projector that is capable of causing a heads up display onto the windshield. Thus, the projector can project an image to the windshield. A second button may be present and used to activate the projection mode of the intelligent mirror. In some embodiments, the intelligent mirror may be designed such that the project mode may only be activated when the computer device is in an active use mode, i.e., the applications of the computer device are accessible through the mirror and at least part of the mirror is not in a state in which it can reflect light.

In some embodiments, the rearview mirror further comprises a microphone. Optionally, it may also comprise a speaker. One benefit of the microphone is that it can be used to facilitate hands free use of the smartphone. The information received from the microphone may be transmitted to a central processing unit of either or both of the computer device and the intelligent mirror to cause activation of an application or carrying out of a task, e.g., switching between a mode in which the smartphone is displayed on the mirror and a mode in which it is not displayed, or switching between a mode in which the projector project images on the windshield and does not project images on the windshield.

In some embodiments, the rearview mirror comprises circuitry and a connector, wherein the connector comprises pins that are operably coupled to the circuit and the pins are configured to engage contacts of the smartphone. The electronic circuitry allows for communication between the mirror and smartphone when the smartphone is within the housing. The connector may be configured to connect to a plurality of different types of smartphones and is complementary to the elements of smartphones that permit wired communications. Additionally or alternatively, the circuit may be part of a central processing unit ("CPU") that is configured to connect to a computer of the vehicle through Wi-Fi. Depending on the year of the car, Wi-Fi connection may be through on board diagnostics (OBD) I or OBD II. The vehicle may be designed such that its computer is capable of being activated and controlled by one or both of physical controls and voice activated controls. The physical controls may be located on the rearview mirror or at other locations within the vehicle, for example, on the steering wheel or on the center console between the driver's seat and the front passenger seat. Further, in some embodiments, there are duplicative controls. Thus, there may be a control on the rearview mirror and the same control on the steering wheel, thereby allowing the user a choice of how to operate the intelligent mirror.

The rearview mirror may further comprise a rotation mechanism. The rotation mechanism may be configured to be capable of rotating all or part of the touchscreen. For example, the rotation mechanism is capable of rotating the touchscreen up to 90 degrees. In some embodiment, there are only two stable position: (i) horizontal, which refers to the normal orientation of the mirror; and (ii) vertical, which refers to an orientation that is 90 degrees from the horizontal. The mirror may be designed such that rotation from horizontal to vertical is clockwise and that rotation from to vertical to horizontal is counterclockwise. Alternatively, the mirror may be designed such that rotation from vertical to horizontal is counterclockwise and that rotation from to vertical to horizontal is clockwise. In some embodiments, the computer device is rotated along with the touchscreen, whereas in other applications, the computer device is not rotated.

An additional feature that may be present is an opening in a location that corresponds to a location of a camera feature on the smartphone. In some embodiments, the housing has a first opening in a first location that corresponds to a location of a first camera feature of the smartphone and a second opening in a second location that corresponds to a location of a second camera feature of the smartphone. As persons of ordinary skill in the art are aware, many smartphones are capable of taking still pictures and/or video in a forward direction and a rearward direction by the presence of two lenses. In some embodiments, the intelligent mirror is equipped to permit continued use of these features of the smartphone when the smartphone is within the receptacle. Thus, there may be an aperture on the rear of the intelligent mirror that is located in a position that permits the smartphone to function as a camera, and optionally on the front face of the mirror, there is an opening for a lens or the covering is sufficiently transparent to allow for images to be recorded through it.

According to another embodiment, the present invention is directed to an automobile that comprises an interior cabin, a windshield, and a rearview mirror. The interior cabin may be a cabin of any type of car, including but not limited to a sedan, a race car, a convertible, or a minivan. Furthermore, when the vehicle is a convertible, the interior cabin is defined as the location that would be defined by the interior space when the convertible top is in a position that defines a closed volume.

The windshield is preferably made of laminated glass, which may for example be referred to as safety glass. Thus, it preferably comprises two pieces of glass with a thin layer of vinyl between them. The present invention may be used with windshields that are in automobiles that are currently being manufactured and used in automobiles purchased by the public.

Preferably, the rearview mirror comprises: a housing, wherein the housing comprises a docking element that is configured to receive a computer device; a reflective surface; a touchscreen, wherein the touchscreen overlays part or all of the reflective surface and the touchscreen is configured to operate in at least two modes, wherein in a first mode the touchscreen is a graphic user interface that is configured to receive input from a user and wherein in a second mode, the touchscreen is transparent; and a projector, wherein the projector is located on a rear side of the housing and is configured to project an image onto a windshield. The touchscreen is operably coupled to the computer device when the computer device is engaged by the rearview mirror, and thus able to communicate with the computer device through circuitry within the rearview mirror.

Within the automobile there may be a power supply and a cable that connects the rearview mirror to the power supply. In some embodiments, power may be supplied to the intelligent mirror through two power feeds. By way of a non-limiting example, power may be supplied to the intelligent mirror from a battery along wires. Accordingly, the intelligent mirror may comprise a power adapter, which as persons of ordinary skill in the art are aware, are common for use with docking stations. The power adapter may for example comprise a 30 pin Apple connector or a 6 pin lightening connector. The power adapter may serve one or two functions: providing energy to the smartphone, optionally to charge the smartphone's battery, and enabling communication with certain features of the car, e.g., a stereo. Alternatively or additionally, the smartphone will communicate with the car through Wi-Fi protocols. Furthermore, various embodiments of the present invention may be used with Bluetooth technologies, which refer to wireless technologies that are standard for exchanging data of short distances. These technologies may use short-wavelength radio transmission in the ISM band of from 2400-2480 MHz from fixed and mobile devices, thereby creating personal area networks that have high levels of security.

In one embodiment, leaving the battery, there may be a first wire that is the positive wire and travels to contacts in a port that correspond to pin 1 or pin 16 within the intelligent mirror, and there may be a second wire that is a negative wire that travels to contacts in a port that correspond to pin 2 or pin 12. The potential difference may, for example, be 12 volts. The two wires may be fused in a 10 amp in line that contains one or more resistors and has a potential difference of about 5.5 volts to match the USB power and be connected to the USB port.

The wires may for example be hidden within an A-pillar. As persons of ordinary skill in the art are aware, the A-pillar of a vehicle is the first pillar of the passenger compartment. It usually borders one side of the windshield.

The power adapter described above may also be referred to as a cable-connector. Preferably, the cable connector has a positive and negative wire. As persons of ordinary skill in the art will recognize, the set of pins that emerge from an iPhone 4 contain positive and negative elements; whereas the set of pins that emerge from an iPhone 5 do not contain these elements. Thus, when an iPhone 5 is used, an additional adapter may be utilized to enable communication with that device.

As the discussion above highlights, different smartphones need different cable-connectors. Optionally, a user of a car with an intelligent mirror could order the mirror that is equipped with the appropriate cable-connector for his or her smartphone. Alternatively, the intelligent mirror could contain a plurality of cable-connectors and a slider or other mechanical tool that permits selection of the correct adapter.

In some embodiments, an additional cable emerges from the intelligent mirror to a region of the automobile that allows for grounding.

Additionally or alternatively, there may also be a sound system and one or more audio leads, wherein the audio leads connect the rearview mirror to the sound system. These leads may permit communication with a stereo of a vehicle and the projection of sound through the speakers within the vehicle. Thus, by way of further example, pin 8 of the smartphone may contact the corresponding contact within the receptacle to facilitate right audio within the automobile. This may be referred to as the tip. Pin 9 of the smartphone may contact the corresponding contact within the receptacle to facilitate left audio within the automobile. This may be referred to as the ring. In this embodiment, pin 10 would correspond to the sleeve.

There may also be a sensor that automatically determines whether the intelligent mirror should be in a standard lighting mode, i.e., no lamp on to facilitate use as a mirror, or whether it should be in a lamp-on mode, in which case a dim lighting is provided to view the smartphone. In one embodiment, the lamp-on mode is automatically activated when the smartphone use of the mirror is activated. Optionally, this may also cause the head lights of the automobile to be turned on if they have not otherwise been turned on.

Preferably, in the rearview mirror, the automobile further comprises a circuit and a connector, wherein the connector comprises pins that are operably coupled to the circuit and the pins are configured to engage contacts of the smartphone.

Additionally, in some embodiments, the receptacle is configured to receive smartphones that are of a plurality of different sizes. The receptacle may, for example, contain elements that are compressible when subject to pressure and thus will hold in place smartphones of different sizes.

The housing may have an opening in a location on its rear side that corresponds to a location of a camera feature of the smartphone. Thus, there may be a visual pass through that allows the camera to takes still or video pictures when engaged with the intelligent mirror.

In some embodiments, the mirror functions as a telematics mirror. The term "telematics" refers to the mirror and cellular telephone circuitry being in direct communication with an inboard vehicle communication system software, computer chip, sensor, transmitter, receiver, microprocessor or other electronic devices. In various embodiments, the computer device is in communication with the central processing unit of the motor vehicle and is capable of running and/or displaying diagnostics.

The above-mentioned embodiments are described in connection with automobiles. However, they may be used in connection with other motor vehicles, including but not limited to boats and buses. As persons of ordinary skill in the art will recognize, the present invention is intended to be used only in circumstances that will not impede safe operation of the motor vehicle or cause distraction of a driver. Thus, by way of example it may be used when an automobile is parked.

Additionally, the above-mentioned embodiments are described as for use in connection with rearview mirrors. However, one can use the present invention by placing the phone in a receptacle that is located in another place such as in a steering wheel, on a dashboard or in a seat divider and through wired and/or wireless technology have the phone in communication with a mirror that has a pico projector.

Furthermore, in some embodiments, the mirror or vehicle that contains the mirror also contains a laser jammer, which also may be referred to as a laser defuser, laser shifter or laser scrambler. As persons of ordinary skill in the art know, a laser jammer detects an incoming laser beam and sends a signals (e.g., a light noise) that confuse the transmitter of the beam (e.g., a laser gun) so that it does not detect a speed. When this feature is present, preferably it is not used for the purpose of jamming laser guns of law enforcement in jurisdictions in which such a use is prohibited by law. The laser jammer functionally may be within the housing of the mirror or be found as part of an application on the smartphone. The laser jamming functionality may, for example, be used to thwart attempts by third parties who use lasers in order to determine the speed of the vehicle that contains the laser jammer.

A smartphone that is used in connection with the present invention preferably has all of the necessary equipment for transmitting and receiving telephone calls, e.g., a SIM card if necessary, and hardware and software for wireless communication through various cellular networks. Additionally, as with many currently known technologies, preferably the smartphone contains technologies that permit voice activation and operation, e.g., Apples' Siri technology, and the intelligent mirror has a microphone that is operably coupled to the computer device.

In some embodiments, the intelligent mirror has voice activated technologies. These technologies may enable a user to direct the intelligent mirror to move among different states, e.g., (1) as a pure mirror; (2) as a mirror on its left portion and a smartphone display on its right portion, which is in a horizontal orientation; (3) as a mirror on its left portion and a smartphone display on its right portion, which is in a vertical orientation; (4) with projection functionally activating in combination with any of (1)-(3); and (5) with camera functionality in combination with any of (1)-(4).

In some embodiments, the intelligent mirror comprises global positioning satellite (GPS) functionality independent of any GPS functionality in the computer device. In other embodiments, the vehicle in which the intelligent mirror is situated comprises global positioning satellite (GPS) functionality independent of any GPS functionality in the computer device.

Various embodiments of the present invention may be further understood by reference to the accompanying figures. The figures are intended for illustrative purposes only and should not be construed as limiting the invention in any way.

FIG. 1 shows a front view of a mirror. There is a standard windshield mount 102, which enables mounting to the windshield of a motor vehicle. Also shown is the mirror glass 107, which may comprise a thin plastic overlay. A pivot point 104 is illustrated by broken lines to represent that this element is not seen by a user.

On the top of the mirror are three buttons 101, which protrude through the housing 105, and which can enable control of various features of the intelligent mirror. Examples of these features include but are not limited to projection of sound, ejection of a computing device and activation/deactivation of display of the screen of the computing device. The broken vertical line on the right portion of the mirror provides a right most outline of where a smartphone would sit when engaged within a housing of the mirror. For reference, also shown is a location of a microphone 103, and an angle adjuster 106.

Figure 2:
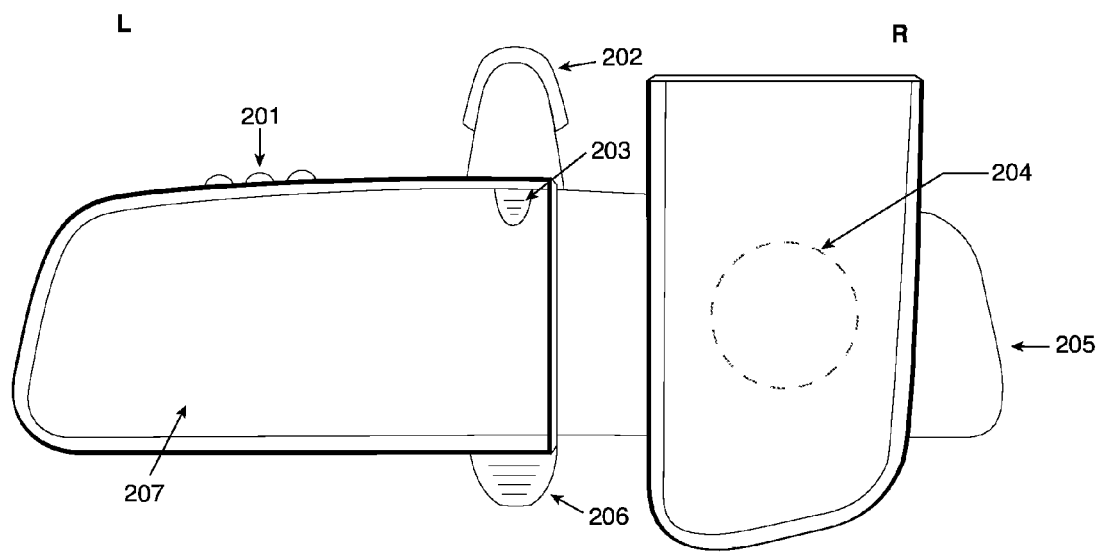
FIG. 2 is a representation of a front view of an intelligent mirror of the present invention with a portion of the mirror in a vertical orientation.

FIG. 2 shows a mirror similar to that of FIG. 1; however, the right portion of the mirror has been rotated approximately ninety degrees. Rotation may be along a pivot point 204. In this figure the pivot point is shown in broken lines; however, it would not be visible to user of the device.

As this figure illustrates, the portion of the intelligent mirror that rotates is only a front portion (e.g., approximately 5%-40% or 10%-30% of the depth of the intelligent mirror) of the right portion (e.g., approximately 30-50% or 40-45% of the length of the intelligent mirror). Thus, part of the housing 205, the part behind where the computer device is housed, would remain in its original orientation. For reference related to FIG. 1, also shown are the mirrored glass, optionally with the thin plastic covering 207, the angle adjuster 206, the microphone 203, the control buttons 201, and the windshield mount 202.

In FIGS. 1 and 2, the location within the rearview mirror housing for the smartphone is shown as being on the right side. There is no technological impediment to putting the location on the left side. However, in many cases in which drivers sit on the left side of the vehicle, the drivers may prefer to have the location on the right side because in this configuration, when the phone is in the vertical orientation, it will be less distracting to the driver and more readily accessible to a passenger or co-pilot. As persons of ordinary skill in the art are aware, in jurisdictions in which drivers sit on the right side of the vehicle, the opposite configuration would typically be more desirable.

Figure 3:
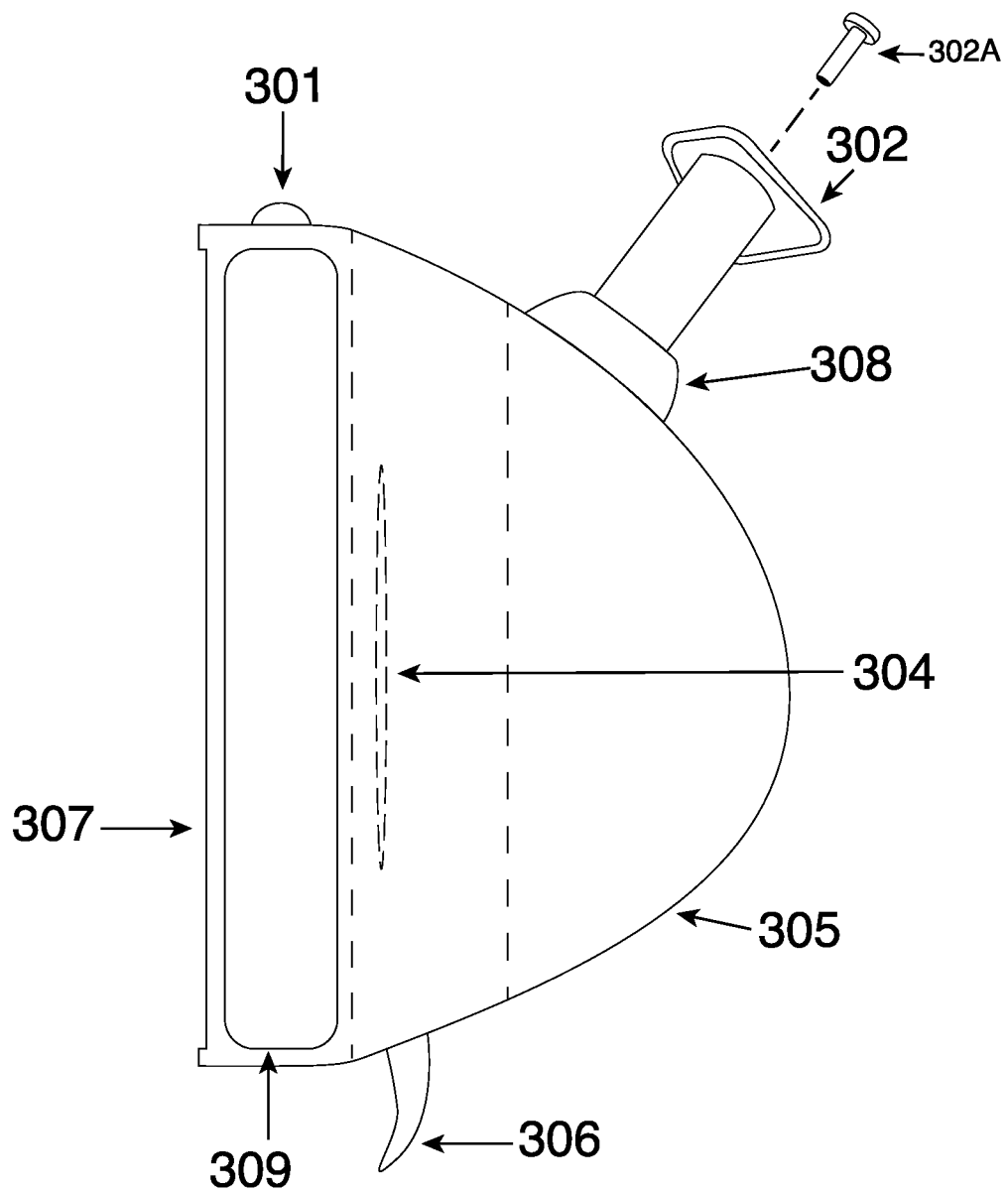
FIG. 3 is a representation of a side view of a mirror of the present invention.

FIG. 3 shows a side view of a mirror of the present invention. The mirror may be mounted to a windshield by devices that are now known or that will come to be known for mounting rearview mirrors to automobiles, including but not limiting to male 302A and female 302 members, or screws and threads (not shown).

The mirror may have a mirror adjust pivot point 308 that permits a driver to adjust the housing 305 of the mirror. Also present is an angle adjuster 306, which permits angling of the mirror glass 307, which comprises the reflective surface of the device. The mirror also contains an opening that is equipped with a spring loaded mount to permit release from opening 309, and a button 101 that controls release from the mount. Shown in broken lines is pivot point 304.

Figure 4:
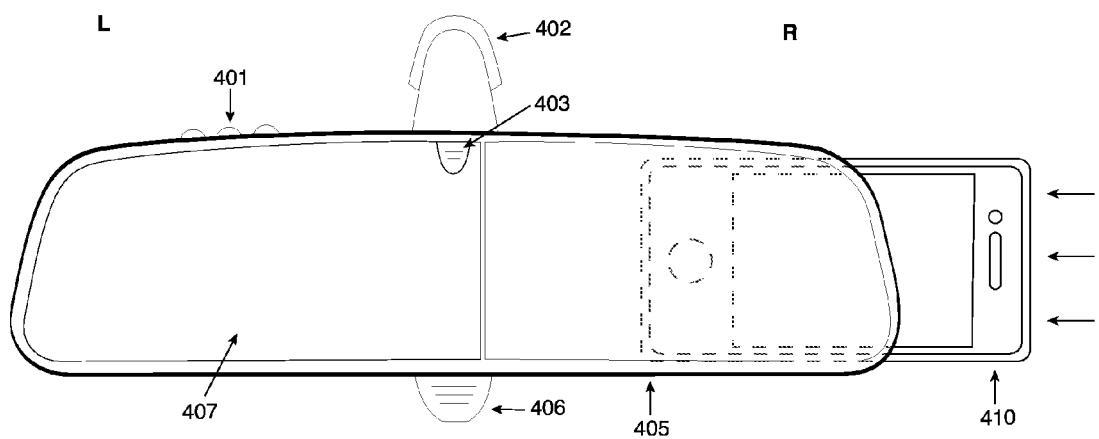
FIG. 4 is a representation of a front view of an intelligent mirror of the present invention, wherein a smartphone is partially inserted into the mirror.

FIG. 4 shows a method for inserting a smartphone into an intelligent mirror. The smartphone 410 enters from the right side of the mirror, which corresponds to the passenger side of the vehicle and is inserted into the molded plastic body 405.

For reference, also shown are the windshield mount 402, the control buttons 401, the microphone 403 and the angle adjuster 406 and the reflective surface 407.

Figure 5:
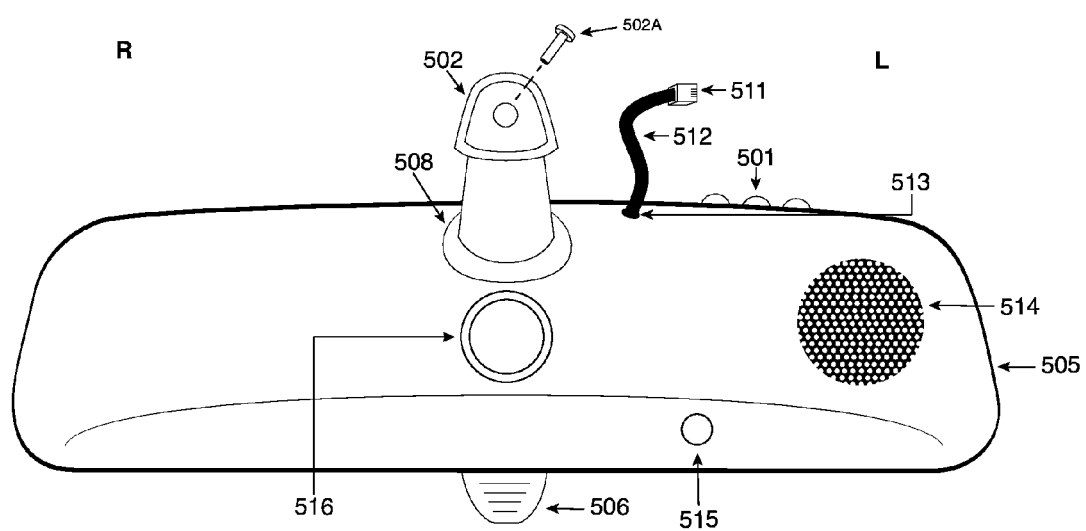
FIG. 5 is a representation of a rear view of an intelligent mirror of the present invention.

FIG. 5 shows a reverse view of a mirror of the present invention. For reference, the figure shows the mounting apparatus 502 and 502A, as well as the molded plastic body 505, the mirror adjust pivot 508, the control buttons 501 and the angle adjuster 506. The figure also shows a speaker 514. The speaker is located on the side opposite to where the smartphone is loaded. Further, the figure shows a projector lens 515 and lamp 516.

FIG. 5 also shows an option for connecting the intelligent mirror to the computer of an automobile. Though a grommet 513 emerges a wire harness 512 that at the end opposite to that of the grommet connector to a connector 511.

Figure 6:
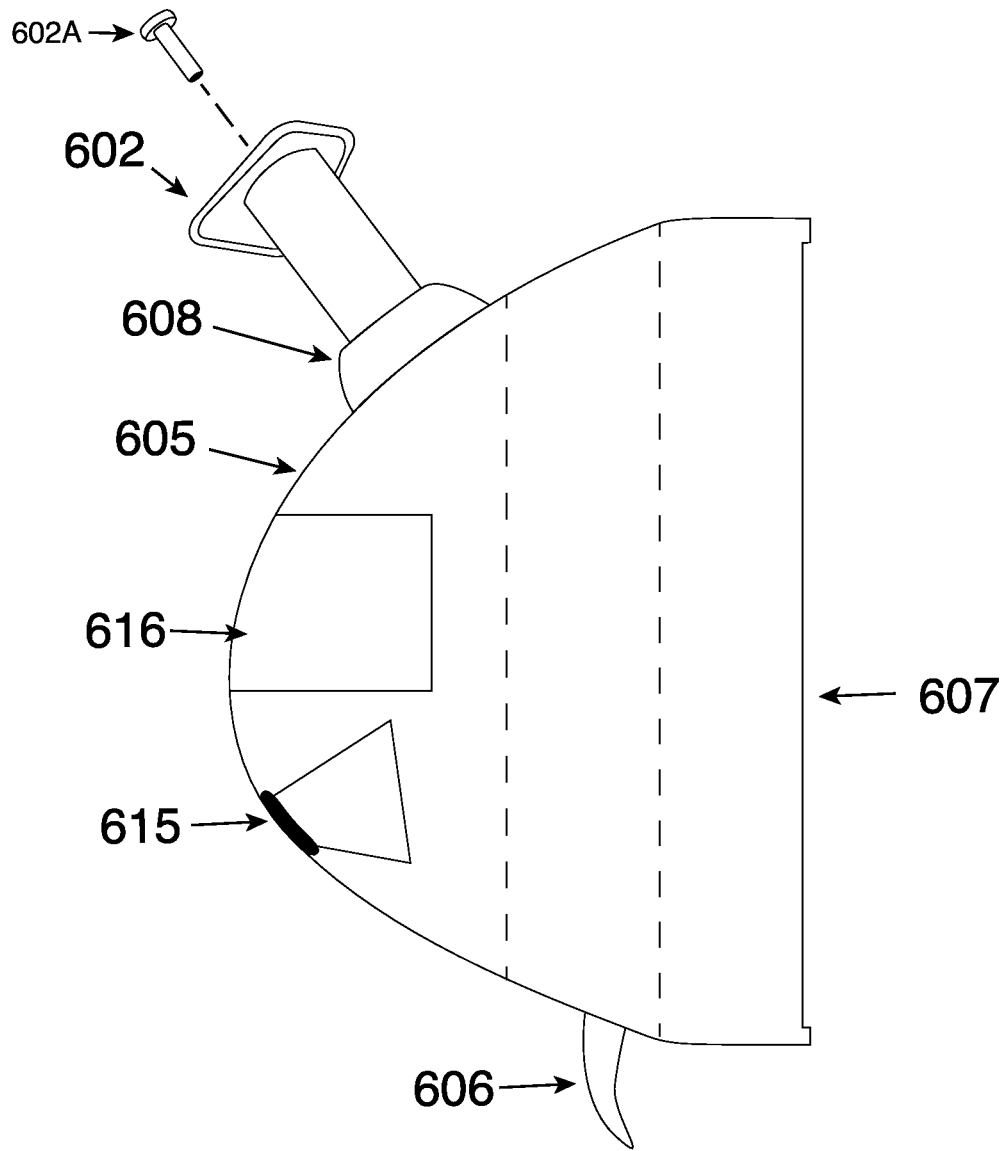
FIG. 6 is a representation of a side view of an intelligent mirror of the present invention.

FIG. 6 shows a side view of an intelligent mirror. For reference, right-most in the figure is the mirror glass or thin plastic 607. Also shown is the housing 605, which contains a pico projector lens 615, and a pico projector lamp and housing for electronics 616 above the projector. The figure also shows the location of the angle adjuster 606 and the mirror adjust pivot 608. In the figure, the lamp is shown as oriented 180 degrees from the mirror (or thin plastic). The mirror adjust pivot is shown as connected to a standard windshield mount 602 that is secured by a securing element such as a screw 602A that may be associated with a threading, not shown, but internal to the mount.

Figure 7:
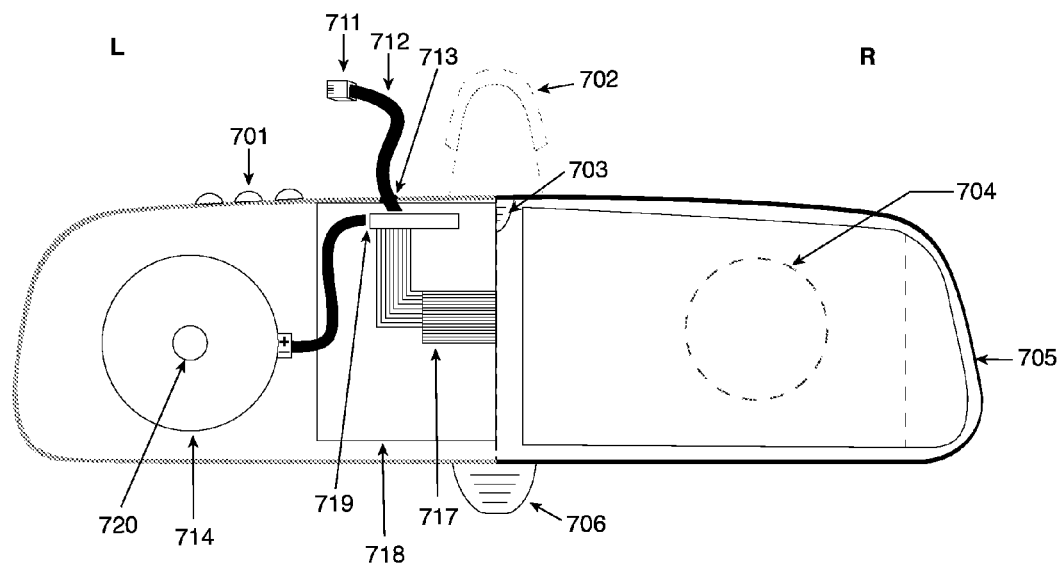
FIG. 7 is a representation of a front view of an intelligent mirror of the present invention, as well as certain internal circuitry.

FIG. 7 is a representation of a front view of a mirror of the present invention with part of the internal elements shown. Accordingly, the mirror is shown within the plastic housing 705. Although not visible to the user, the figure also shows a pivot point 704 in broken lines behind the location in which the smartphone will sit. At the bottom of the figure the angle adjuster 706 is shown, and at the top of the housing part of the microphone 703 is shown. To further assist the reader, for reference the location of the windshield mount 702 is provided in broken lines. Similarly, the buttons 701 for control of the device are shown.

In the left portion of the figure is shown a speaker cone 720, within a speaker 714 that is attached via wiring to an endpoint wiring harness 719 that is located within a printed circuit board ("PCB") 718. The PCB also contains the wiring circuit 717 that allows for communication with the smartphone when engaged as well as communication with the control buttons 701. The endpoint wiring harness is also connected to a wire harness 712 through a grommet 713, which is connected to a connector 711 that is connected to wiring to the computer of the vehicle (not shown in FIG. 7).

Figure 8:
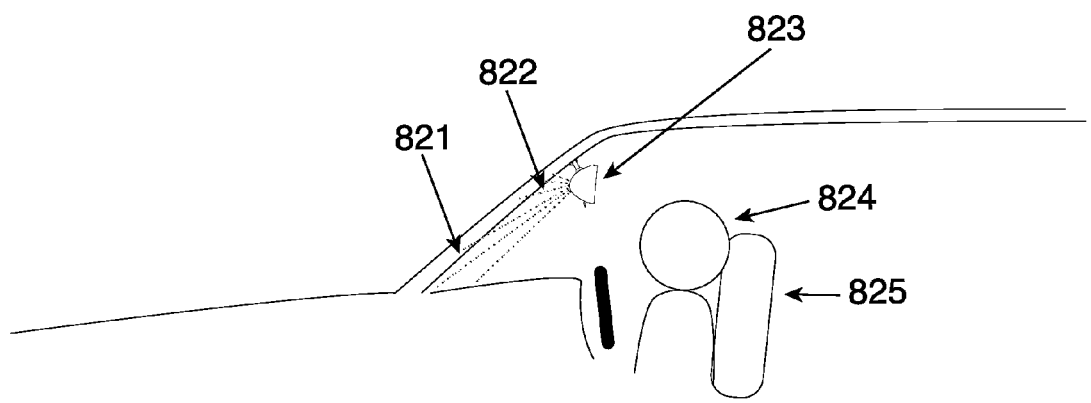
FIG. 8 is a representation of a part of an automobile that contains a mirror of the present invention and a person.

FIG. 8 is representation of a side view of the intelligent mirror within the cabin of a vehicle. A person 824 sits leaning against the back of a seat 825. From his or her vantage point, he or she can view the mirror 823 and see the projection of the mirror 822 on the windshield 821.

Persons of ordinary skill in the art will readily appreciate the various applications of the present invention. For example, a person who is lost can, while parked, display a large map on the windshield. Additionally, in poor visibility conditions, a user can determine what is ahead by causing the cellular phone to obtain data transmitted to it wirelessly that corresponds to real time information of upcoming traffic or hazards. In some embodiments, the intelligent mirror or cellular phone comprises an infrared and/or sonar functionality that permits detections of items or physical activities that may or may not be visible or difficult to see and projects them onto the windshield.

In one embodiment, the driver may insert his or her smartphone into the rearview mirror prior to or after turning on the engine of the battery of the car. As persons of ordinary skill in the art are aware, during the operation of many car radios and CD players, a user can send electricity from the battery without turning on the engine. Similarly, the vehicles of the present invention can be designed such that electricity flows to the rear view mirror whenever it would flow to a radio or CD player, regardless of whether the car engine has been turned on.

While the car is parked, and electricity is flowing to the mirror, the driver may turn the right portion of the mirror ninety degrees and use the smartphone as he or she would outside of the mirror. He or she may use a map application and through voice activation or by pressing a button on the top of the rearview phone, cause a projection the map onto the windshield. The user may, after studying the map, return the portion of the mirror that houses the smartphone to a horizontal position and either through voice activation or by pressing a button on the top of the rearview phone cause the mirror to return to a state in which it serves solely a reflective purpose.

In another application, the intelligent mirror can be configured to transmit information such as through RFID technologies. This information may correspond to payment information that would enable a driver of a vehicle to make a transaction through a mobile wallet application of the smartphone or a mobile wallet application within the car. These types of payments could be read by appropriately configured technologies and used at drive through channels of commerce, e.g., drive through restaurants, or along highways where tolls are collected.

I claim:

1. A rearview mirror comprising:
   (a) a housing, wherein the housing comprises a docking element that is configured to receive a smartphone;
   (b) a reflective surface;
   (c) a touchscreen, wherein the touchscreen overlays part or all of the reflective surface and the touchscreen is configured to operate in at least two modes, wherein in a first mode the touchscreen is a graphic user interface that is configured to receive input from a user and wherein in a second mode, the touchscreen is transparent; and
   (d) a projector, wherein the projector is located on a rear side of the housing and is configured to project an image onto a windshield,
   wherein the rearview mirror is mounted within a vehicle.

2. The rearview mirror of claim 1 further comprising a microphone.

3. The rearview mirror of claim 2 further comprising a speaker.

4. The rearview mirror of claim 1 further comprising a circuit and a connector, wherein the connector comprises pins that are operably coupled to the circuit, wherein the smartphone comprises contacts and the pins are configured to engage the contacts of the smartphone.

5. The rearview mirror of claim 4, wherein the connector is configured to connect to a plurality of different types of smartphones.

6. The rearview mirror of claim 4, wherein the circuit is part of a central processing unit that is configured to connect to a computer of the vehicle through Wi-Fi.

7. The rearview mirror of claim 1, wherein the projector is configured to generate a heads up display.

8. The rearview mirror of claim 1 further comprising a rotation mechanism, wherein the rotation mechanism is capable of rotating all or part of the touchscreen.

9. The rearview mirror of claim 1 further comprising a rotation mechanism, wherein the rotation mechanism is capable of rotating the touchscreen up to 90 degrees.

10. The rearview mirror of claim 1 further comprising a spring locking and release mechanism.

11. The rearview mirror of claim 1 further comprising a stabilization feature, wherein the stabilization feature is capable of stabilizing the smartphone.

12. The rearview mirror of claim 1 further comprising a home button, wherein activation of the home button controls movement of the touchscreen between the first mode and the second mode.

13. The rearview mirror of claim 1, wherein the housing has an opening in a location that corresponds to a location of a camera feature of the smartphone.

14. The rearview mirror of claim 1, wherein the housing comprises a laser jamming element.

15. An automobile comprising:
(a) an interior cabin;
(b) a windshield; and
(c) a rearview mirror comprising:
   i. a housing, wherein the housing comprises a docking element that is configured to receive a smartphone;
   ii. a reflective surface;
   iii. a touchscreen, wherein the touchscreen overlays part or all of the reflective surface and the touchscreen is configured to operate in at least two modes, wherein in a first mode the touchscreen is a graphic user interface that is configured to receive input from a user and wherein in a second mode, the touchscreen is transparent; and
   iv. a projector, wherein the projector is located on a rear side of the housing and is configured to project an image onto a windshield.

16. The automobile of claim 15 further comprising a power supply and a cable that connects the rearview mirror to the power supply.

17. The automobile of claim 16 further comprising a sound system and an audio lead, wherein the audio lead connects the rearview mirror to the sound system.

18. The automobile of claim 16 further comprising a circuit and a connector, wherein the connector comprises pins that are operably coupled to the circuit and smartphone comprises contacts and the pins are configured to engage the contacts of the smartphone.

19. The automobile of claim 15, wherein the receptacle is configured to receive smartphones that are of a plurality of different sizes.

20. The automobile of claim 15, wherein the housing has an opening in a location that corresponds to a location of a camera feature of the smartphone.

* * * * *